US009671946B2

(12) United States Patent
Patel et al.

(10) Patent No.: US 9,671,946 B2
(45) Date of Patent: Jun. 6, 2017

(54) CHANGING SETTINGS FOR MULTIPLE DISPLAY ATTRIBUTES USING THE SAME GESTURE (71) Applicant: Rakuten Kobo, Inc., Toronto (CA)

(72) Inventors: Sneha Patel, Toronto (CA); Anthony O'Donoghue, Toronto (CA)

(73) Assignee: RAKUTEN KOBO, INC., Toronto (CA)

( * ) Notice: Subject to any disclaimer, the term of this patent is extended or adjusted under 35 U.S.C. 154(b) by 214 days.

(21) Appl. No.: 14/174,166

(22) Filed: Feb. 6, 2014

(65) Prior Publication Data

US 2015/0220262 A1    Aug. 6, 2015

(51) Int. Cl.
G06F 3/048    (2013.01)
G06F 3/0484    (2013.01)
G06F 3/0483    (2013.01)
G06F 3/0488    (2013.01)
G06F 3/01    (2006.01)
G09G 5/30    (2006.01)

(52) U.S. Cl.
CPC ......... *G06F 3/04847* (2013.01); *G06F 3/017* (2013.01); *G06F 3/0483* (2013.01); *G06F 3/0488* (2013.01); *G06F 3/04883* (2013.01); *G09G 5/30* (2013.01)

(58) Field of Classification Search
CPC ......... G06T 2207/20144; G06T 7/0081; G06T 2207/10016; G06T 7/0087; G06T 2207/20021; G06T 2207/30176; G06T 2207/30232; G06T 7/0085; G06T 11/60; G06T 2207/10024; G06T 2207/20076; G06T 2207/30196
See application file for complete search history.

(56) References Cited

U.S. PATENT DOCUMENTS

| 5,893,132 A | * | 4/1999 | Huffman | G06F 15/0283 434/167 |
| 2007/0150842 A1 | | 6/2007 | Chaudhri et al. | |
| 2010/0050127 A1 | * | 2/2010 | Peng | G06F 3/0482 715/841 |
| 2011/0256848 A1 | | 10/2011 | Bok et al. | |
| 2011/0310131 A1 | * | 12/2011 | Fergason | G09G 3/3406 345/690 |

(Continued)

FOREIGN PATENT DOCUMENTS

EP    2413226 A2    2/2012

OTHER PUBLICATIONS

"Elocity A7+ Internet Table—User Manual Version 1.5", Nov. 22, 2012, XP055183393.

*Primary Examiner* — Di Xiao (74) *Attorney, Agent, or Firm* — Oblon, McClelland, Maier & Neustadt, L.L.P.

(57) ABSTRACT

Content is displayed on a touchscreen display of a computing system such as an electronic book reader. The content is displayed according to a setting for a first attribute (e.g., level of brightness) and a setting for a second attribute (e.g., day mode or night mode). In response to sensing a motion proximate to the touchscreen, the setting for the first attribute is changed to a different value. In response to a value for the setting for the first attribute crossing a threshold value (e.g., while the motion is being performed), the setting for the second attribute is changed.

22 Claims, 7 Drawing Sheets (56) References Cited

U.S. PATENT DOCUMENTS

| | | | |
|---|---|---|---|
| 2013/0002729 A1* | 1/2013 | Lee | G09G 3/20 345/690 |
| 2013/0099829 A1* | 4/2013 | Vilander | H03L 7/085 327/106 |
| 2013/0187863 A1 | 7/2013 | Rydenhag et al. | |
| 2013/0239057 A1* | 9/2013 | Ubillos | G06F 3/04855 715/833 |
| 2014/0368525 A1* | 12/2014 | Faaborg | G09G 5/02 345/589 |

* cited by examiner

CHANGING SETTINGS FOR MULTIPLE DISPLAY ATTRIBUTES USING THE SAME GESTURE

BACKGROUND

Tablet computer systems, electronic book (e-book) readers, smart phones, and other types of portable devices are increasingly popular. These types of devices have features in common, such as high resolution touchscreens that provide an easy-to-use and intuitive user interface and allow users to interact directly with what is being displayed.

In an e-reader, for example, a page of an e-book is rendered and displayed. The electronic version of the page that is displayed looks very much like the conventional non-electronic version of the page.

One advantage that an e-book has over a conventional non-electronic book is that characteristics of the electronic page can be changed to satisfy a user's preferences considering factors such as ambient light conditions. For example, if the user prefers that the display be brighter or less bright, then the user can adjust the brightness up and down. Brightness can be readily adjusted by, for example, placing two fingers on or near the touchscreen, and then moving (swiping) the fingers up to increase brightness or down to decrease brightness.

Some types of devices, including some e-book readers, allow the user to choose between a first mode, usually known as day mode, and a second mode, usually known as night mode. In day mode, the text is a darker color (usually black) and the background is a lighter color (usually white or nearly white); in night mode, the text is a lighter color (such as white or nearly white) and the background is a darker color (usually black). The level of brightness can be adjusted whether in day mode or in night mode as described above.

SUMMARY

A shortcoming of conventional portable devices such as those described above is that a user adjusts brightness and changes mode using separate sets of actions. That is, to change the level of brightness, the user can swipe his or her fingers up or down; to change mode, however, the user needs to use a different motion or perform a number of additional steps. For example, the user may need to tap the touchscreen to open a menu (a list of topics); select the appropriate topic from the menu, thereby opening another menu; check or uncheck one or more boxes in the second menu, then close the menus to change the mode. If the user then decides that the previous mode was better, the user needs to repeat those steps to undo the change and revert back to the other mode. Thus, in addition to the number of separate steps needed to change mode, another shortcoming of conventional devices is that the user needs to implement the change before seeing the effect of the change.

Embodiments according to the present invention address these shortcomings by allowing a user to change brightness and mode using the same single gesture.

Generally speaking, in embodiments according to the invention, content is displayed on a touchscreen of a computing system such as but not limited to an e-book reader. The content is displayed according to a setting for a first attribute (e.g., a level of brightness) and a setting for a second attribute (e.g., day mode or night mode). In response to sensing a motion proximate to the touchscreen (e.g., a swiping motion), the setting for the first attribute (the "first setting") is changed to a different value. In response to the value for the first setting crossing a threshold value (e.g., the level of brightness reaches a threshold level) while the same motion is being performed, the setting for the second attribute (the "second setting") is changed (e.g., the mode changes). Thus, a motion can be used to change the first setting, the same motion can be continued (or repeated in a continuous manner) until the first setting reaches/crosses a threshold value, at which point the second setting is changed, and the same motion can be continued/repeated after that until the first setting reaches the desired value.

For example, in one embodiment, a multi-point gesture such as a two-finger swipe invokes the process of changing brightness and mode. In one such embodiment, when the swipe gesture is begun, the highest level of brightness in the day mode is displayed. As the swipe gesture is continued in, for example, the downward direction, the level of brightness in day mode decreases. The brightness of the displayed content changes at the same time that the gesture is made. As the swipe gesture continues in the same direction, the level of brightness in day mode may reach, for example, its lowest setting (the aforementioned threshold value). At that point, the mode automatically changes from day mode to night mode; the displayed content is now displayed in night mode, at the highest level of brightness in night mode. If the swipe gesture is continued in the same direction, then the level of brightness in night mode decreases. At this point, the user can reverse the direction of the swipe gesture in order to increase brightness in night mode and/or transition back into and adjust brightness in day mode. At any point, the user can reverse the direction of the swipe gesture to increase brightness within the current mode.

As an alternative, instead of using the highest level of brightness in day mode as the starting point as described above, the current level of brightness in the current mode can be used as the starting point. Also, any of a variety of different gestures other than a two-finger swipe may be used to change brightness and mode such as, but not limited to, a single finger swipe or continuous tapping (using one or more fingers). In an embodiment, a user can select which gesture is to be used to change brightness and mode and which gestures are to be used to control other attributes.

Furthermore, embodiments according to the present invention can be used to change combinations of attributes other than brightness and mode.

In one embodiment, a graphical element is displayed when the user invokes the process of changing attributes. The graphical element changes as the value of the setting for the first attribute changes. In the example above, the graphical element may be a numerical value that indicates the level of brightness (e.g., a value between zero and 100 percent). In day mode, the numerical value decreases as the swipe gesture proceeds in the downward direction and, when the value reaches a threshold (e.g., zero), the change is made to night mode. After the change to night mode, the numerical value is reset to its maximum value, and decreases if the swipe gesture is continued in the downward direction. The numerical value increases if the swipe gesture is in the upward direction. Any other type of graphical element may be used. Also, the graphical element can change according to the setting for the second attribute. For example, the level of brightness in day mode may be represented by changing the brightness of a sun-like element, and the level of brightness in night mode may be represented by changing the brightness of a moon-like element.

In summary, in embodiments according to the present invention, one motion can be used to control/change a combination of attributes of content rendered using a touchscreen device. Multiple operations are replaced with a single familiar operation (e.g., a swipe gesture). A user can receive immediate visual feedback regarding the changes being made; thus, delays associated with conventional methods of changing displayed content are reduced or avoided.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "retrieving," "displaying," "rendering," "sensing," "changing," "receiving," or the like, refer to actions and processes (e.g., flowchart 700 of FIG. 7) of a computer system or similar electronic computing device or processor (e.g., the computing system 100 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Figure 1:
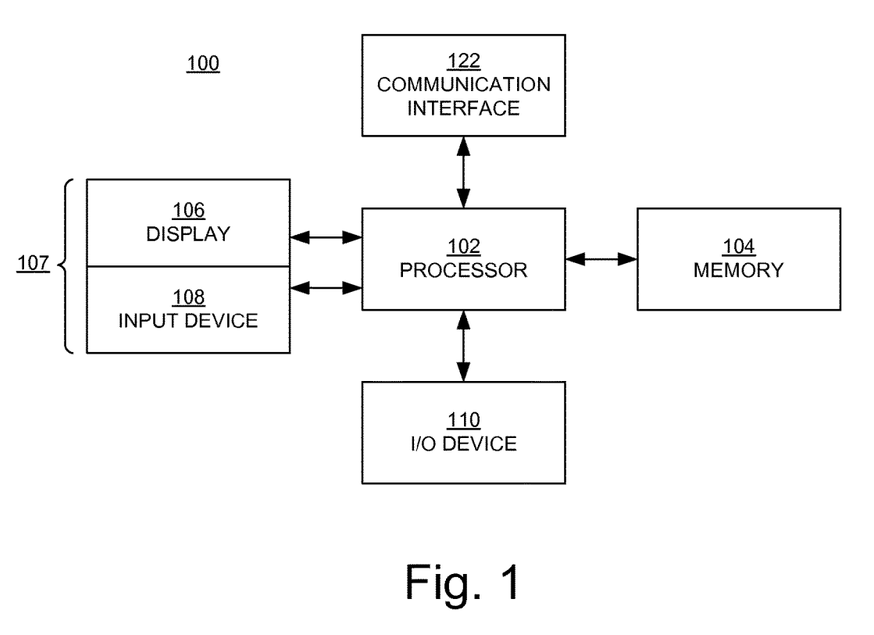
FIG. 1 is a block diagram of an example of a computing system capable of implementing embodiments according to the present disclosure.

FIG. 1 is a block diagram of an example of a computing system or computing device 100 capable of implementing embodiments according to the present invention. The computing system 100 broadly represents any single or multi-processor computing device or system capable of executing computer-readable instructions. Examples of a computing system 100 include, without limitation, an electronic book (e-book) reader, laptop, tablet, or handheld computer. The computing system 100 may also be a type of computing device such as a cell phone, smart phone, media player, camera, or the like. Depending on the implementation, the computing system 100 may not include all of the elements shown in FIG. 1, and/or it may include elements in addition to those shown in FIG. 1.

In its most basic configuration, the computing system 100 may include at least one processor 102 and at least one memory 104. The processor 102 generally represents any type or form of processing unit capable of processing data or interpreting and executing instructions. In certain embodiments, the processor 102 may receive instructions from a software application or module. These instructions may cause the processor 102 to perform the functions of one or more of the example embodiments described and/or illustrated herein.

The memory 104 generally represents any type or form of volatile or non-volatile storage device or medium capable of storing data and/or other computer-readable instructions. In certain embodiments the computing system 100 may include both a volatile memory unit (such as, for example, the memory 104) and a non-volatile storage device (not shown).

The computing system 100 also includes a display device 106 that is operatively coupled to the processor 102. The display device 106 is generally configured to display a graphical user interface (GUI) that provides an easy to use interface between a user and the computing system.

The computing system 100 also includes an input device 108 that is operatively coupled to the processor 102. The input device 108 may include a sensing device (a "touchscreen") configured to receive input from a user and to send this information to the processor 102. The term "touchscreen" is used in the widely accepted manner to include any type or form of sensing device that can sense a user input, including those types of devices that do not require a touch; that is, some touchscreens can sense a user's finger or a stylus that is near (but not touching) the surface of the touchscreen. The processor 102 interprets the sensed input in accordance with its programming. The input device 108 may be integrated with the display device 106 or they may be separate components. In the illustrated embodiment, the input device 108 is a touchscreen that is positioned over or in front of the display device 106. The input device 108 and display device 106 may be collectively referred to herein as a touchscreen display 107. There are many different technologies that can be used to sense a user's input, such as but not limited to technologies based on capacitive sensing and technologies based on resistive sensing.

The communication interface 122 of FIG. 1 broadly represents any type or form of communication device or adapter capable of facilitating communication between the example computing system 100 and one or more additional devices. For example, the communication interface 122 may facilitate communication between the computing system 100 and a private or public network including additional computing systems. Examples of a communication interface 122 include, without limitation, a wired network interface (such as a network interface card), a wireless network interface (such as a wireless network interface card), a modem, and any other suitable interface. In one embodiment, the communication interface 122 provides a direct connection to a remote server via a direct link to a network, such as the Internet. The communication interface 122 may also indirectly provide such a connection through any other suitable connection. The communication interface 122 may also represent a host adapter configured to facilitate communication between the computing system 100 and one or more additional network or storage devices via an external bus or communications channel.

As illustrated in FIG. 1, the computing system 100 may also include at least one input/output (I/O) device 110. The I/O device 110 generally represents any type or form of input device capable of providing/receiving input or output, either computer- or human-generated, to/from the computing system 100. Examples of an I/O device 110 include, without limitation, a keyboard, a pointing or cursor control device (e.g., a mouse), a speech recognition device, or any other input device.

Many other devices or subsystems may be connected to computing system 100. Conversely, all of the components and devices illustrated in FIG. 1 need not be present to practice the embodiments described herein. The devices and subsystems referenced above may also be interconnected in different ways from that shown in FIG. 1. The computing system 100 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into the computing system 100. All or a portion of the computer program stored on the computer-readable medium may then be stored in the memory 104. When executed by the processor 102, a computer program loaded into the computing system 100 may cause the processor 102 to perform and/or be a means for performing the functions of the example embodiments described and/or illustrated herein. Additionally or alternatively, the example embodiments described and/or illustrated herein may be implemented in firmware and/or hardware.

Figure 2:
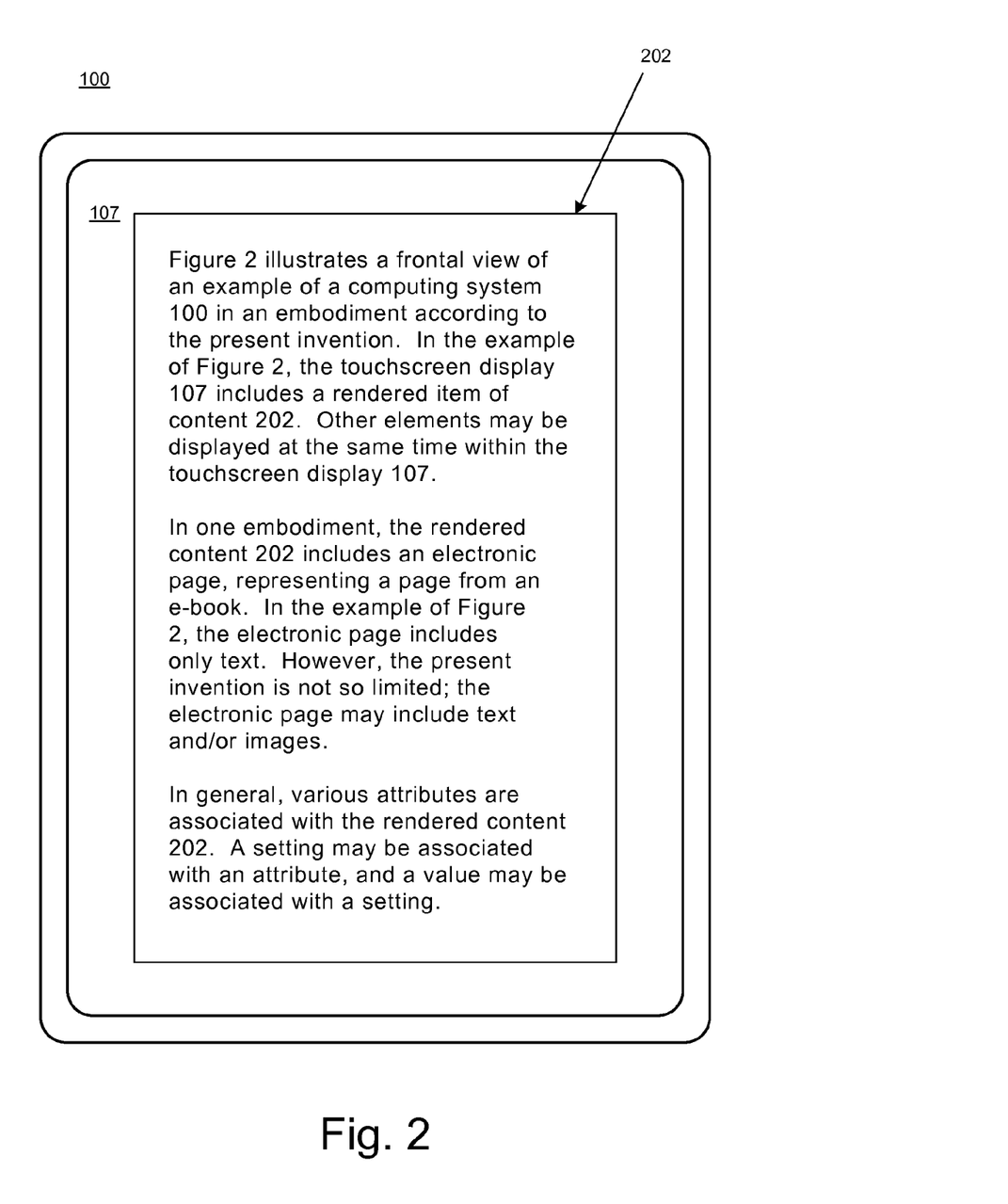
FIG. 2 illustrates a frontal view of an example of a computing system, showing a display screen, in an embodiment according to the present invention.

FIG. 2 illustrates a frontal view of an example of a computing system 100 in an embodiment according to the present invention. In the example of FIG. 2, the touchscreen display 107 includes a rendered item of content 202. Other elements may be displayed at the same time within the touchscreen display 107.

In one embodiment, the rendered content 202 includes an electronic page, representing a page from an e-book. In the example of FIG. 2, the electronic page includes only text. However, the present invention is not so limited; the electronic page may include text and/or images.

In general, various attributes are associated with the rendered content 202. These attributes include, but are not limited to:

the font size of the text within the electronic page;

the spacing between lines of the text within the electronic page;

the margins (the distances from the left, right, top, and bottom margins of the electronic page to the content within the electronic page);

the background color of the electronic page, including black and white;

the font color (the color(s) of the text), including black (against a lighter background) and white (against a darker background);

the font face (the type(s) of font used in the text, such as Arial, and also effects such as bold, underlining, and/or italics);

the brightness of the touchscreen display 107, including the brightness of the background and the brightness of the text/images; and the contrast of the touchscreen display.

A setting may be associated with an attribute, and a value may be associated with a setting. Using brightness as an example, the setting may be the level of brightness; the level of brightness may be indicated using a numerical value.

As used herein, mode of operation (e.g., day mode or night mode) is also an attribute, and the selected mode of operation (e.g., operating in day mode or operation in night mode) is the setting for that attribute. Settings for other attributes may be selected automatically by the computing system 100 according to the selected mode of operation. For example, the background color and the text color may be selected depending on whether the computing system 100 is operating in day mode or in night mode. In day mode, a lighter background color (e.g., white) may be used with a contrasting, darker text color (e.g., black). In night mode, a darker background color (e.g., black) may be used with a contrasting, lighter text color (e.g., white).

In embodiments according to the present invention, a combination of different attributes can be changed using a single continuous or nearly continuous motion, movement, or gesture on or near the touchscreen display 107. The motion/gesture can be made by a user with his or her fingers, in contact with or proximate to the touchscreen 107. In general, the user's gesture is made within sensing distance of the touchscreen display 107. The computing system 100 detects the gesture and, in response, can automatically change the settings for a combination of attributes as will be described below, and can also automatically reformat the rendered content 202 using the new settings.

The types of motions/gestures include touching (or nearly touching) the touchscreen display 107 with one or more fingers and moving the finger(s) in one direction or another (e.g., upward or downward relative to the orientation of the rendered content 202) in a swiping gesture. A swiping gesture may include a series of swipes, one after another, close enough to each other in time to be considered part of the same gesture and continuous in nature. The end or cessation of a swiping gesture is indicated by moving the fingers out of sensing range (e.g., the fingers are lifted off of or away from the touchscreen display 107) for an extended period of time or by not repeating the swiping motion soon enough after the previous swipe (the computing system 100 can be programmed so that it can recognize when a swiping gesture is done).

Any of a variety of different gestures other than a one-finger or two-finger swipe may be used to change a combination of attributes. Such gestures include, but are not limited to, repeated tapping (using one or more fingers), where the taps are close enough to one another in time to be considered part of the same gesture and continuous in nature. In an embodiment, a user can select which gesture is to be used to change a combination of attributes and which gestures are to be used to control other attributes.

Advantageously, these types of motions/gestures are intuitive and already familiar to many people. Moreover, they can be made without having to open a toolbar or the like, and without the use of drop-down menus, slider bars, and the like. In essence, an intuitive and familiar action (e.g., a swipe gesture) can be used to change a combination of attributes.

Generally speaking, in embodiments according to the invention, content 202 is displayed on the touchscreen 107 according to a setting for a first attribute (e.g., a level of brightness) and a setting for a second attribute (e.g., day mode or night mode). In response to sensing a motion proximate to the touchscreen (e.g., a swiping motion), the setting for the first attribute (the "first setting") is changed to a different value. In response to the value for the first setting crossing a threshold value (e.g., the level of brightness reaches a threshold level) while the motion is being performed, the setting for the second attribute (the "second setting") is changed (e.g., the mode changes). Thus, a single, continuous motion (a motion that is considered to be continuous, as described above) can be used to change the first setting; the same motion can be continued until the first setting crosses a threshold value, at which point the second setting is changed; and the same motion can be continued after that until the first setting reaches the desired value.

Figure 3:
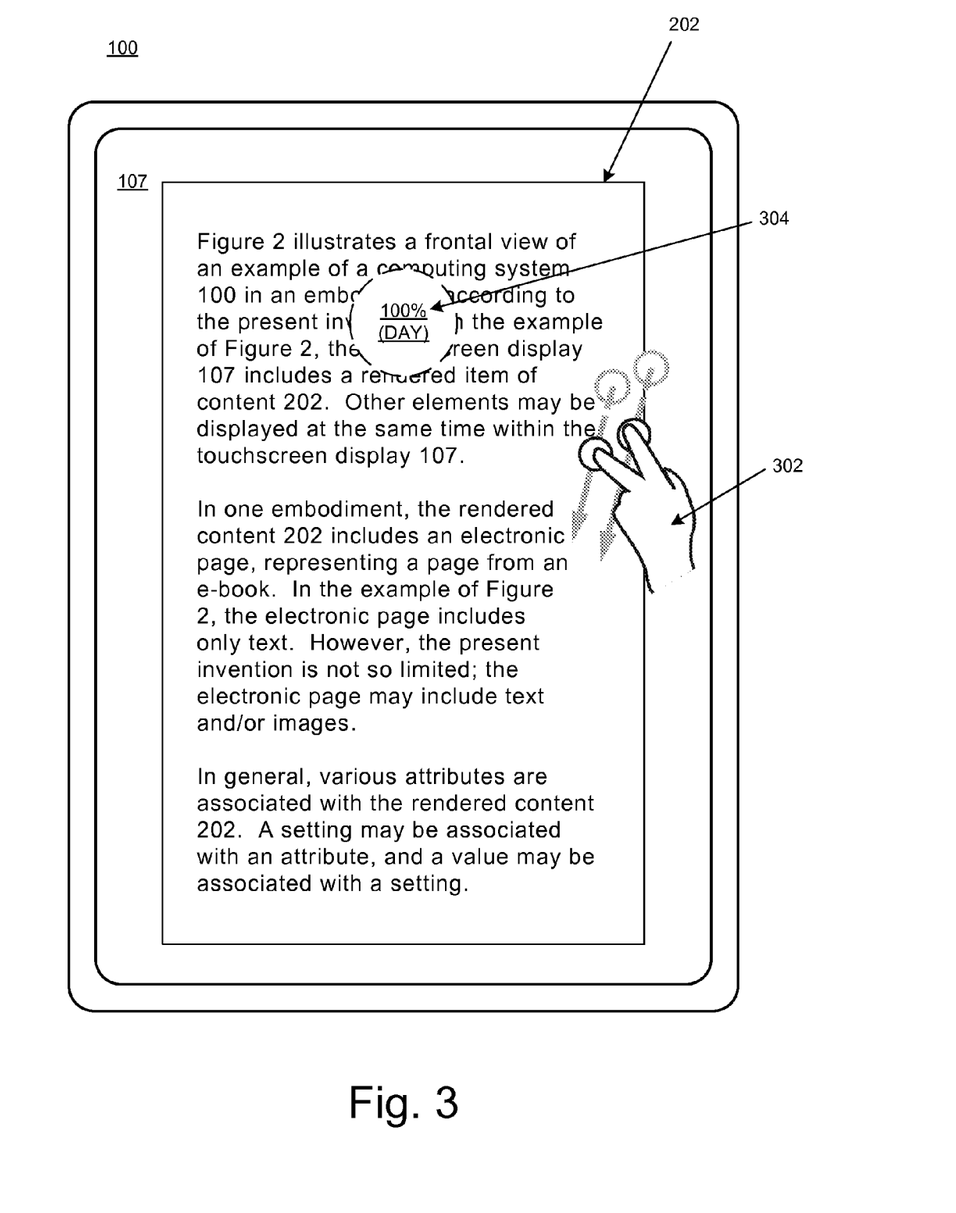
FIGS. 3, 4, 5, and 6 illustrate examples in which settings for a combination of attributes (brightness and mode) are changed in embodiments according to the present invention.

FIGS. 3, 4, 5, and 6 illustrate examples in which settings for a combination of attributes (brightness and mode) are changed in embodiments according to the present invention. With reference first to FIG. 3, a frontal view of an example of a computing system 100 is shown. In the example of FIG. 3, the touchscreen display 107 includes a rendered item of content 202 as described above.

The content 202 is rendered on the touchscreen display 107 according to a setting for a first attribute (a first setting) of the content and also according to a setting for a second attribute (a second setting). In this example, the first attribute is brightness, the first setting is the current value of the level of brightness, the second attribute is mode, and the second setting is the current mode (day or night).

To begin the process of changing brightness and mode, a user places his or her fingers on or near (within sensing distance of) the touchscreen display 107 and performs the gesture that is associated with the process. In this example, a two-finger swipe gesture is used to change brightness and mode. The two-finger swipe gesture is illustrated as element 302 in the following figures (element 302 is not to scale, and does not actually appear as a rendered element on the display 107).

In one embodiment, a graphical element 304 appears when the user invokes the process of changing brightness and mode. The graphical element 304 represents the current value for the first setting (the current level of brightness), and changes as the value of the first setting changes. In the example of FIG. 3, the graphical element 304 includes a numerical value that indicates the current level of brightness (e.g., a value between zero and 100 percent). However, the present invention is not so limited; different types of graphical elements, including non-numerical elements, may be used. For example, a sun-like element can be used to represent day mode, and the length of the sun's rays can be used to represent the level of brightness in day mode; similarly, a moon-like element can be used to represent night mode, and the phase of the moon can be used to represent the level of brightness in night mode. Generally speaking, the graphical element 304 is used to indicate where the current level of brightness is within the range of brightness, so that the user knows how close the level of brightness is to its maximum level and/or its minimum level.

In one embodiment, when the user invokes the process of changing brightness and mode by performing a swipe gesture, the level of brightness automatically changes to the highest level in day mode. In other words, if the level of brightness is less than 100 percent, when the process of changing brightness and mode is initiated, then the level of brightness is increased to 100 percent, as shown in the example of FIG. 3. However, the present invention is not so limited. For example, instead of using the highest level of brightness in day mode as the starting point, the current level of brightness (which may be less than 100 percent) in the current mode (day mode or night mode) can be used as the starting point.

In the examples below, brightness is decreased by swiping in the downward direction relative to the orientation of the displayed content, and increased by swiping upward. However, this can be reversed depending on the user's preferences; a downward motion can be used to increase brightness, and an upward motion can be used to decrease brightness. In general, the use of gestures to change settings can be customized according to user preferences, and different gestures can have different meanings. That is, the user can specify which combination of attributes is associated with which gesture. For example, a user can access a list of attributes (e.g., via a drop-down menu) and select a combination of attributes from the list. For the selected attributes, the user can also access a list of gestures (e.g., via another drop-down menu) and select a gesture that is linked to the selected attributes. In response, the computing system 100 (FIG. 1) is automatically programmed to change the settings for the selected attributes in response to the selected gestures.

Figure 4:
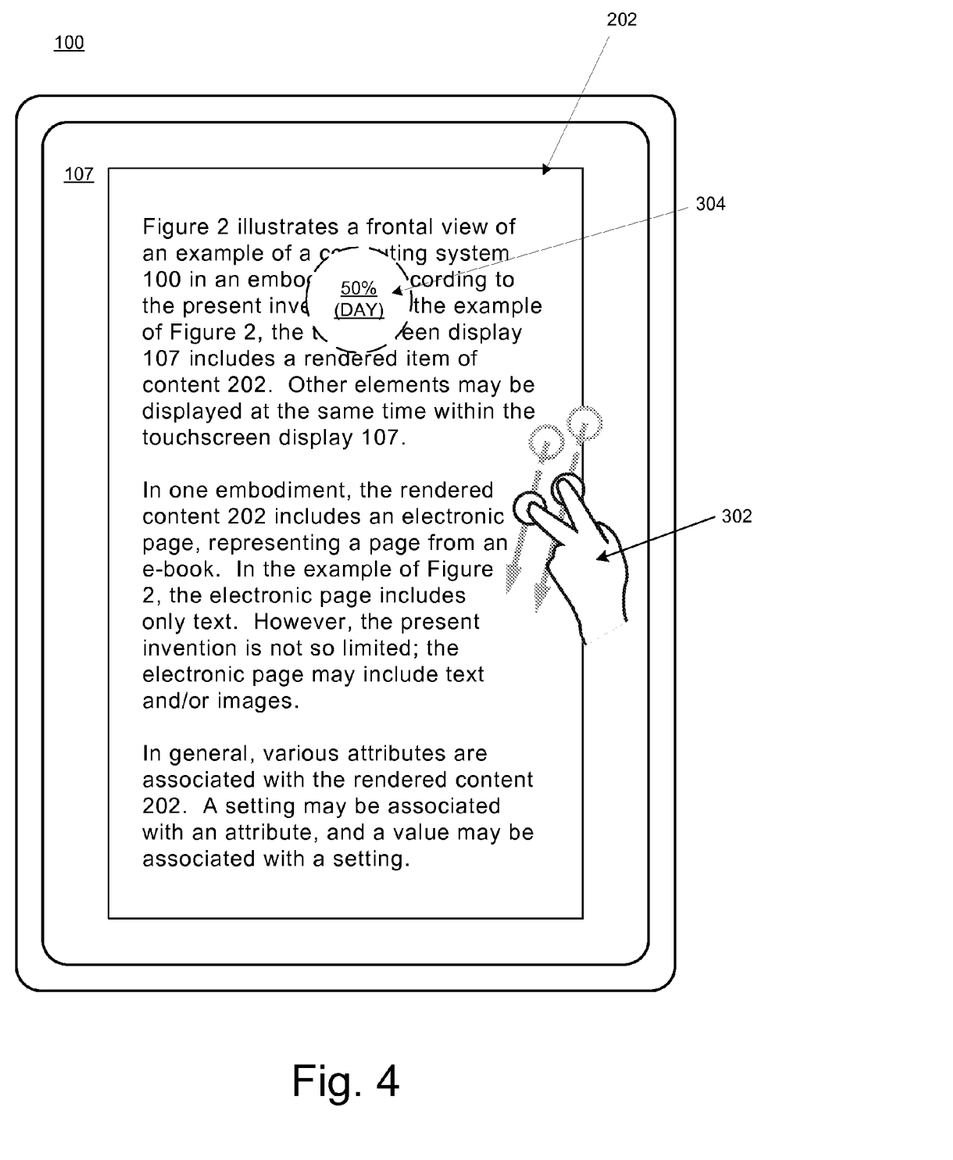

In FIG. 4, the level of brightness decreases as the swipe gesture proceeds in the downward direction. The brightness of the displayed content changes at the same time the gesture is made. Also, the graphical element 304 changes as the level of brightness decreases (e.g., the numerical value decreases). The user can reverse the direction of the gesture at any point to increase brightness.

Figure 5:
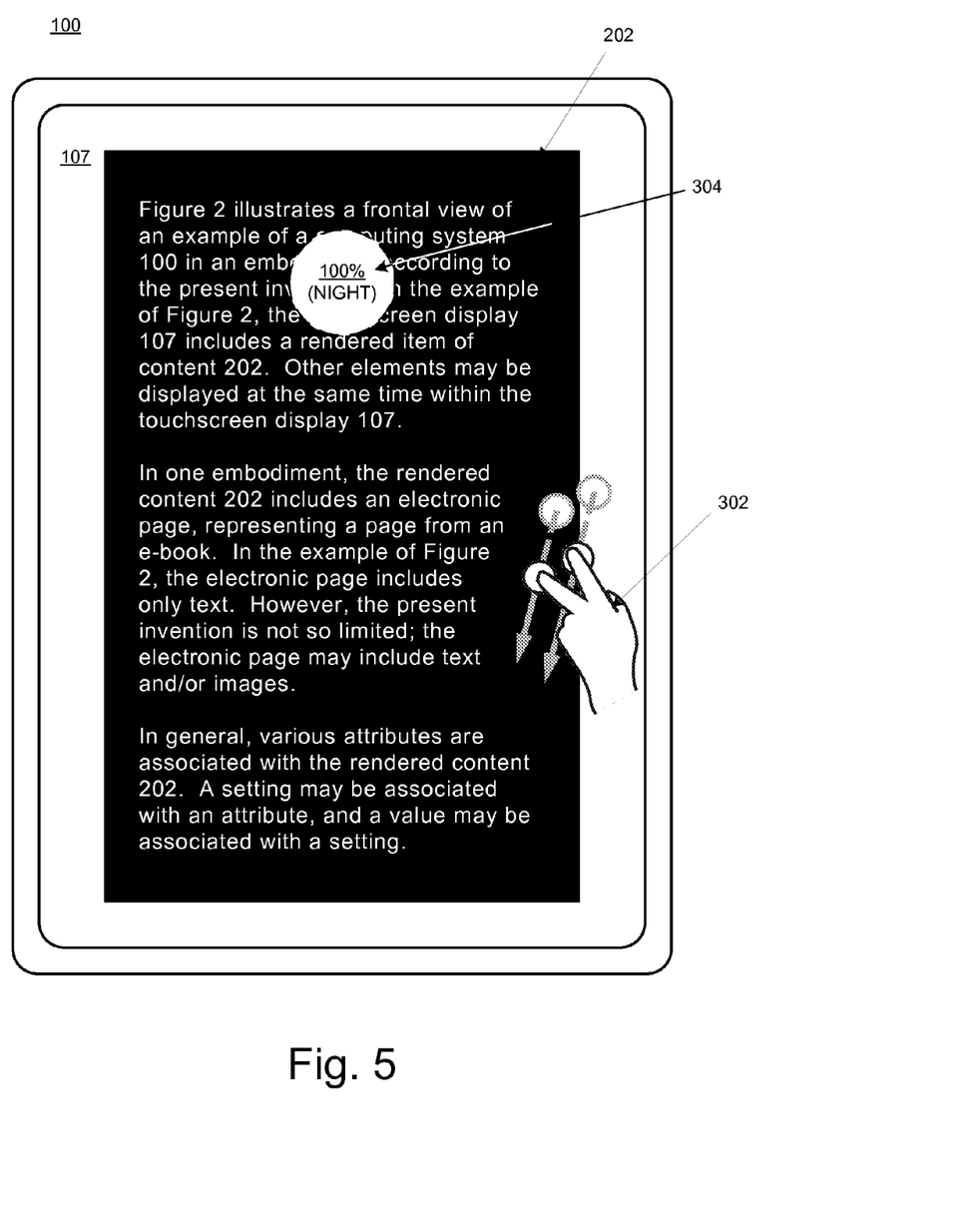

As the swipe gesture is continued in the downward direction, the level of brightness in day mode may reach a threshold value (such as, but not limited to, the lowest possible value for the setting). At that point, the mode automatically changes from day mode to night mode, and the displayed content is now displayed in night mode, at the highest level of brightness in night mode, as shown in FIG. 5. The graphical element 304 is also updated accordingly, as shown in FIG. 5.

Figure 6:
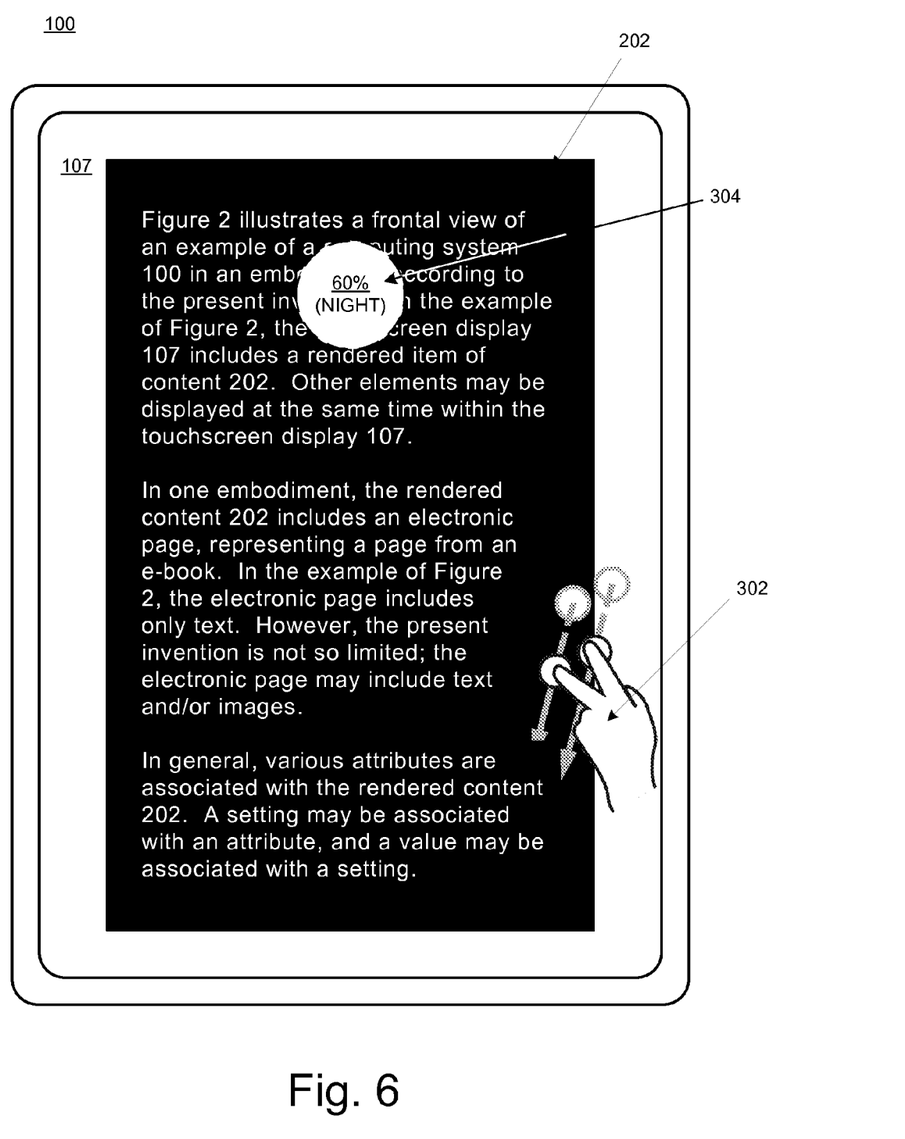

If the swipe gesture is continued in the same direction, then the level of brightness in night mode decreases, as shown in FIG. 6.

The user can reverse the direction of the swipe gesture at any point, in order to increase brightness in night mode and/or transition back into and/or adjust brightness in day mode.

Although the examples of FIGS. 3-6 use brightness and mode, the present invention is not so limited. Embodiments according to the present invention can be used to change combinations of attributes other than brightness and mode. Embodiments according to the present invention can also be used on devices other than e-book readers, with content other than electronic pages such as, but not limited to, videos.

Figure 7:
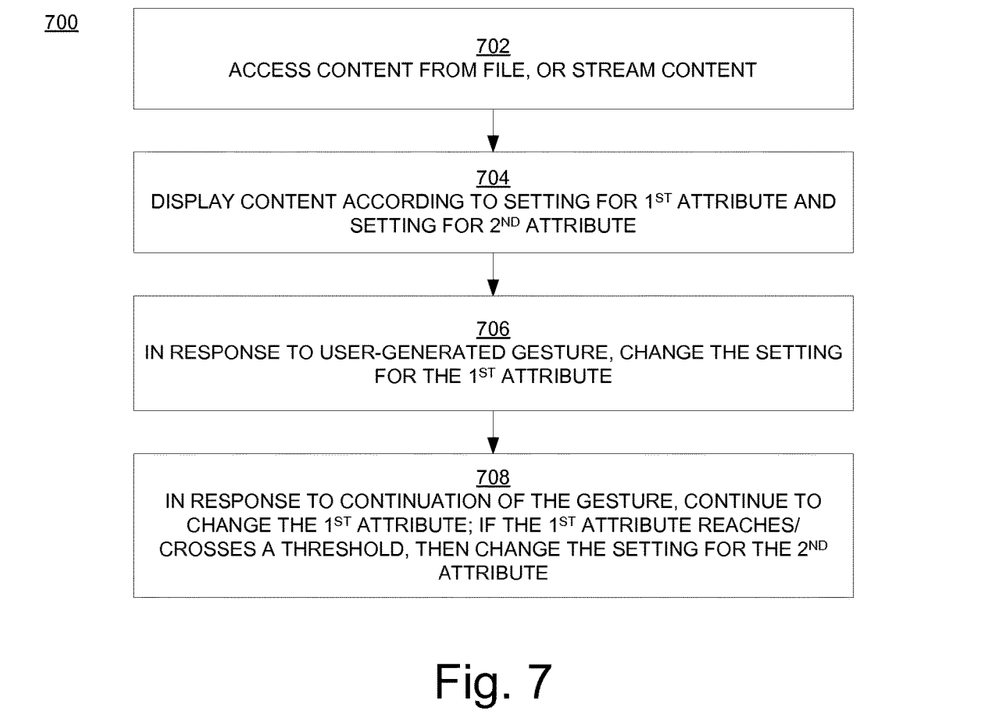
FIG. 7 is a flowchart of an example of a computer-implemented method for changing settings of a combination of attributes (e.g., brightness and mode) in embodiments according to the present invention.

FIG. 7 is a flowchart 700 of an example of a computer-implemented method for changing setting of attributes (e.g., brightness and mode) in embodiments according to the present invention. The flowchart 700 can be implemented as computer-executable instructions residing on some form of computer-readable storage medium (e.g., using the computing system 100 of FIG. 1).

In block 702 of FIG. 7, in one embodiment, a file stored in memory is accessed. The file includes data comprising content that can be rendered on the touchscreen 107 (FIG. 1). Alternatively, the content may be streamed to the computing system 100 from another device.

In block 704 of FIG. 7, the content is displayed according to a setting for a first attribute (e.g., a level of brightness) and a setting for a second attribute (a mode, such as day mode or night mode).

In block 706, in response to sensing a user-generated movement relative to the touchscreen 107 (FIG. 1), the setting for the first attribute is changed while the setting for the second attribute is not necessarily changed. In other words, for example, the level of brightness can be changed while the computing system 100 remains in day mode. In one embodiment, a graphical element (e.g., the graphical element 304 of FIG. 3) is displayed in response to sensing the user-generated movement, to indicate a level of brightness or to indicate a level of brightness relative to a maximum level and/or a minimum level.

In block 708 of FIG. 7, in response to sensing continuation of the motion proximate to the touchscreen, the setting for the first attribute continues to change. The graphical element 304, if present, also changes as the setting for the first attribute changes. If the setting for the first attribute reaches and/or crosses a threshold, then the setting for the second attribute changes to a different value. In other words, for example, if the level of brightness reaches its lowest value in day mode, or some other specified value, then the display is changed to night mode. The change from day mode to night mode results in a change in the color of the content's text (e.g., from a darker color to a lighter color, such as black to white) and a change in the color of the background (e.g., from a lighter color to a darker color, such as white to black).

In summary, embodiments according to the present invention can allow a user to more expeditiously and more intuitively make changes to displayed content. One motion can be used to control/change a combination of attributes (e.g., brightness and day/night mode). Multiple operations are replaced with a single familiar operation (e.g., a swipe gesture). Also, a user can receive immediate visual feedback regarding the changes being made.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A non-transitory computer-readable storage medium having computer-executable instructions that, when executed, cause a computing system to perform a method comprising:
    displaying content on a display screen of the computing system, the display screen comprising a sensing device, the content displayed according to a setting for a first attribute and a setting for a second attribute, wherein the first attribute includes a range of values having a threshold value that is configured to trigger a change in the setting for the second attribute;
    in response to sensing at least one of a continued motion and a continuously repeated motion proximate to the sensing device, changing the setting for the first attribute to the different value;
    in response to a value for the setting for the first attribute reaching a threshold value, changing the setting for the second attribute; and
    in response to sensing the at least one of the continued motion and the continuously repeated motion proximate to the sensing device after changing the setting for the second attribute, changing the first attribute to a desired value that crosses the threshold value.

2. The non-transitory computer-readable storage medium of claim 1 wherein the content comprises at least a portion of an electronic book (e-book) and the computing system comprises an e-book reader.

3. The non-transitory computer-readable storage medium of claim 1 wherein the first attribute is selectable from a plurality of attributes.

4. The non-transitory computer-readable storage medium of claim 1 wherein the first attribute is brightness.

5. The non-transitory computer-readable storage medium of claim 1 wherein the second attribute is selected from the group consisting of: font color; background color; day mode; and night mode.

6. The non-transitory computer-readable storage medium of claim 1 wherein the motion comprises a user gesture selected from the group consisting of: touching the sensing device with a single finger; touching the sensing device with two fingers; moving a single finger proximate to the sensing device; and moving two fingers proximate to the sensing device.

7. The non-transitory computer-readable storage medium of claim 1 wherein the method further comprises displaying a graphical element that changes as the setting for the first attribute changes.

8. The non-transitory computer-readable storage medium of claim 1 wherein the setting for the first attribute is changed simultaneously with the sensing of the at least one of the continued motion and the continuously repeated motion proximate to the sensing device.

9. The non-transitory computer-readable storage medium of claim 1, wherein the change in the setting for the second attribute includes a transition from a day mode including a first range of values to a night mode including a second range of values.

10. A system comprising:
    a processor;
    a display coupled to the processor;
    a sensing element coupled to the processor; and
        memory coupled to the processor, the memory have stored therein instructions that, if executed by the system, cause the system to execute operations comprising:
        accessing a file stored in the memory, the file comprising data comprising content;
        displaying the content on the display according to a setting for a first attribute and a setting for a second attribute, wherein the first attribute includes a range of values having a threshold value that is configured to trigger a change in the setting for the second attribute;
        in response to sensing at least one of a continued motion and a continuously repeated motion proximate to the sensing device, changing the setting for the first attribute to the different value;
        in response to a value for the setting for the first attribute reaching a threshold value, changing the setting for the second attribute; and
        in response to sensing the at least one of the continued motion and the continuously repeated motion proximate to the sensing device after changing the setting for the second attribute, changing the first attribute to a desired value that crosses the threshold value.

11. The system of claim 10 wherein the content comprises at least a portion of an electronic book (e-book) and the computing system comprises an e-book reader.

12. The system of claim 10 wherein the first attribute is selectable from a plurality of attributes.

13. The system of claim 10 wherein the first attribute is brightness.

14. The system of claim 10 wherein the second attribute is selected from the group consisting of: font color; background color; day mode; and night mode.

15. The system of claim 10 wherein the motion comprises a user gesture selected from the group consisting of: touching the sensing device with a single finger; touching the sensing device with two fingers; moving a single finger proximate to the sensing device; and moving two fingers proximate to the sensing device.

16. The system of claim 10 wherein the operations further comprise displaying a graphical element indicative of a value for the setting for the first attribute.

17. A method of changing attributes of displayed content, the method comprising:
    on a device comprising a touchscreen, displaying an electronic page at a level of brightness according to a setting for a first attribute and a setting for a second attribute, wherein the first attribute includes a range of values having a threshold value that is configured to trigger a change in the setting for the second attribute, the electronic page comprising text and a background;

in response to sensing at least one of a continued motion and a continuously repeated motion proximate to the touchscreen, changing the setting for the first attribute to the different value;

in response to a value for the setting for the first attribute reaching a threshold value, changing the setting for the second attribute; and in response to sensing the at least one of the continued motion and the continuously repeated motion proximate to the touchscreen after changing the setting for the second attribute, changing the first attribute to a desired value that crosses the threshold value.

18. The method of claim 17 wherein the device comprises an e-book reader.

19. The method of claim 17 further comprising changing a color of the text to a lighter color and a color of the background to a darker color when the level of the first attribute decreases to less than the threshold.

20. The method of claim 17 further comprising changing the color of the text to a darker color and the color of the background to a lighter color when the level of the first attribute increases to greater than the threshold.

21. The method of claim 17 wherein the motion comprises a user gesture selected from the group consisting of: touching the sensing device with a single finger; touching the sensing device with two fingers; moving a single finger proximate to the sensing device; and moving two fingers proximate to the sensing device.

22. The method of claim 17 further comprising displaying a graphical element that changes as the setting for the first attribute changes.

* * * * *